(No Model.)
O. S. TURNER.
BELT STUD.
No. 295,599. Patented Mar. 25, 1884.
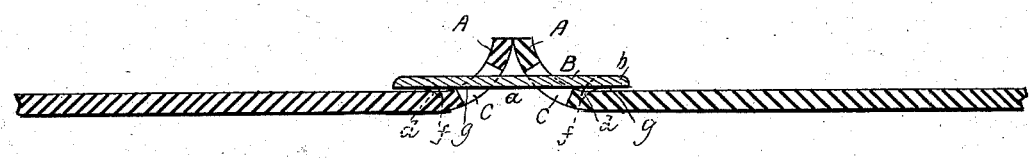
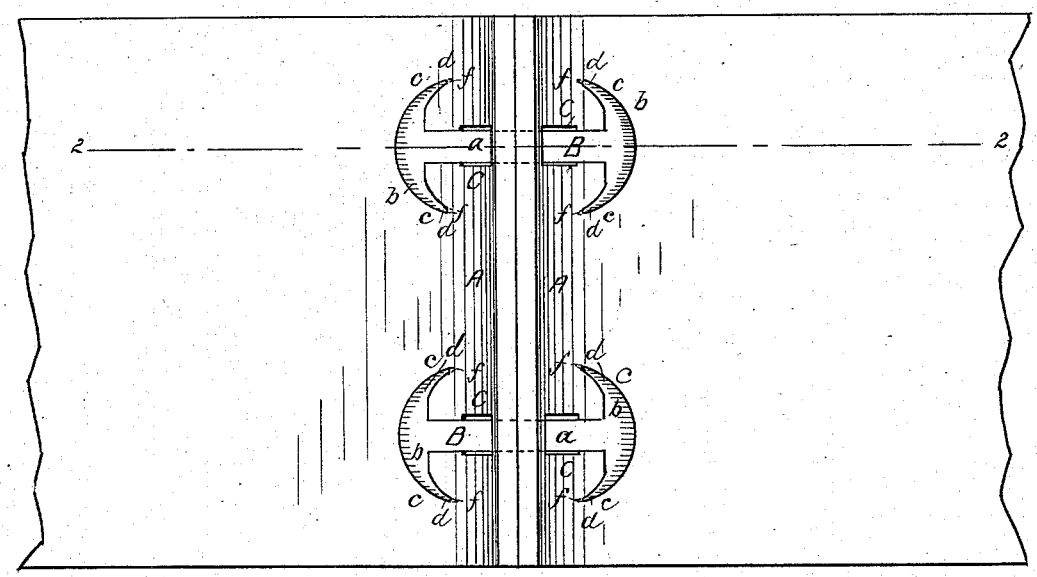
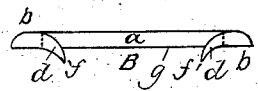
WITNESSES
Wm. S. Bellows
Henry A. Clifford
O. S. TURNER,
INVENTOR,
PER Brown Bros.
ATTORNEYS

UNITED STATES PATENT OFFICE.

ORRIN S. TURNER, OF NEW VINEYARD, MAINE.

BELT-STUD.

SPECIFICATION forming part of Letters Patent No. 295,599, dated March 25, 1884.

Application filed May 31, 1883. (No model.)

*To all whom it may concern:*

Be it known that I, ORRIN S. TURNER, of New Vineyard, in the county of Franklin and State of Maine, have invented certain new and useful Improvements in Belt-Studs, of which the following is a full, clear, and exact description.

This invention relates to belt-studs composed of a flat piece or shank of metal or other suitable material, having a cross or bar or head at each end—such, for instance, as shown and described in the schedule annexed to the Re-issued Letters Patent of the United States issued to George W. Blake, inventor, dated August 4, 1868, No. 3,065.

This invention in substance consists in providing either one or both of the cross pieces or bars or heads with an elongation or extension, or extensions projecting therefrom in the direction of the length and toward the cross-piece at the opposite end of the shank, and preferably pointing the outer end thereof, all in a manner when the stud is in use to secure a set of the stud upon the belt by an interlock of such projections or extensions therewith, substantially as hereinafter described, reference being had to the accompanying plate of drawings, in which—

Figure 1 is a longitudinal section through two ends of a belt secured together with the studs; Fig. 2, a view in plan of the belt and stud shown in Fig. 1; Fig. 3, an edge view of a belt-stud detached; and Fig. 4, a perspective view thereof.

In the drawings, A A represent the contiguous ends of a leather belt secured together by studs B B. The contiguous ends of the belt A to be united are first cut square across their width, and then short slits C are cut through each end of the belt as far back from the edge as may be desired. These slits C are cut in the direction of the length of the belt, and care should be taken that the distance between the slits of one section should correspond with the distance between the slits through the end of the opposite section, thereby bringing the longitudinal edges of the two portions of the belt in a line with each other. These slits should all be made of the same length determined by the size of the studs used to join the ends of the belt. Each stud B has a shank, *a*, made of a flat piece of metal or of other suitable material, and of a suitable length, and there is at each end of said shank a cross piece or bar or head, *b*, provided at each of its outer ends, *c*, with a prolongation or extension, *d*, preferably pointed at its extreme end, *f*, and projecting from its cross-head in the line of direction of the shank *a*, and toward the cross-head at the opposite end of said shank. Each prolongation or extension *d* is bent to an angle relative to the flat faces of its cross-head, and this bending of the several projections is upon and in relation to the same side or flat face of the stud, as shown more particularly in Fig. 3. The size of the double-headed stud must be determined by the size and strength of the belting with which they are to be used, and the number of studs used will depend upon the width of the belt.

The studs may be readily punched out from sheet material of a suitable kind, and thus can be made at a trifling cost.

Having prepared the contiguous ends of the belt to be united with slits C, as before described, the studs are all passed through the slits C—one to each slit—and then turned so as to present their flat faces *g*, having the bent and tapering projections or elongations of their cross-heads *b* projecting therefrom to the outside surface of the belting, as represented in Figs. 1 and 2 of the drawings, in which position they will remain, and their heads projecting will prevent the belt from being drawn apart or separated. The elongations or extensions *d* of the cross-heads, owing to the strain or tension upon the belt, necessarily bite, as it were, or grip the leather, and this grip is rendered still more effective by bending and also pointing them, as described, but neither of which, however, is absolutely essential, although obviously desirable. This bite of the cross-heads in the leather serves to fasten the studs in position upon the belt, and thereby to obviate all sliding of their cross-heads upon the belt or of the belt upon their cross-heads, thus preventing the wear of the belt. As is plain, such setting of the studs is most advantageous with belts the leather of which is soft or springy in character.

It will be seen that owing to the firm hold which the bent ends of the cross-head have in the leather, the length of the slits cut in the belt for the reception of the studs, and their position in relation to the ends of the belt, becomes in a measure immaterial.

The studs herein described can be made with great cheapness and ease, and used with belts or bands intended for various purposes.

The elongations or extensions may be at one end only of each cross-head, or at intermediate points in the length of the cross-heads or at intermediate points and at the ends as well. Each elongation is in fact of the nature of a tooth preferably bent and pointed.

Having thus described my invention, what I claim, and desire to secure by Letters Patent, is—

1. As an article of manufacture, the stud B, composed of a shank, $a$, and of end cross-heads provided with elongations $d$, projecting therefrom toward the opposite head, and bent downward, substantially as described.

2. As an article of manufacture, a stud, B, composed of a shank, $a$, and of end cross-heads, $b$, provided with elongations $d$, projecting therefrom toward the opposite head, and bent and pointed at their outer ends, substantially as described.

3. As an article of manufacture, a stud, B, composed of a shank, $a$, and of cross-heads $b$, provided with elongations $d$, projecting therefrom toward the opposite head, and having tapering and pointed ends, substantially as described.

In testimony whereof I have hereunto set my hand in the presence of two subscribing witnesses.

ORRIN S. TURNER.

Witnesses:
 GEO. W. GOWER,
 LEWIS GARDNER.